United States Patent
Wang et al.

(10) Patent No.: US 12,521,551 B2
(45) Date of Patent: Jan. 13, 2026

(54) BIOCOMPATIBLE SOFT PRESSURE SENSOR AND METHOD OF MONITORING PRESSURE SUBCUTANEOUSLY

(71) Applicant: University of Chicago, Chicago, IL (US)

(72) Inventors: Sihong Wang, Chicago, IL (US); Sliman Bensmaia, Chicago, IL (US); Stacy Lindau, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 436 days.

(21) Appl. No.: 18/144,351

(22) Filed: May 8, 2023

(65) Prior Publication Data

US 2023/0355964 A1    Nov. 9, 2023

Related U.S. Application Data

(60) Provisional application No. 63/339,623, filed on May 9, 2022.

(51) Int. Cl.
*A61N 1/05* (2006.01)
*A61N 1/36* (2006.01)

(52) U.S. Cl.
CPC ......... *A61N 1/0551* (2013.01); *A61N 1/3614* (2017.08)

(58) Field of Classification Search
CPC ........................ A61N 1/0551; A61N 1/3614
See application file for complete search history.

(56) References Cited

U.S. PATENT DOCUMENTS

| | | | | |
|---|---|---|---|---|
| 4,852,443 A * | 8/1989 | Duncan | ................. | G10H 3/146 84/DIG. 12 |
| 4,986,136 A * | 1/1991 | Brunner | ................. | G01L 1/146 361/278 |
| 2008/0202251 A1 * | 8/2008 | Serban | ................ | H03K 17/962 29/25.03 |
| 2011/0270028 A1 * | 11/2011 | Honaryar | ................ | G01L 17/00 73/753 |
| 2013/0047747 A1 * | 2/2013 | Joung | ................. | G06F 3/04142 73/862.68 |
| 2014/0371624 A1 * | 12/2014 | Ziaie | ...................... | A61B 5/036 600/561 |

(Continued)

FOREIGN PATENT DOCUMENTS

WO    WO 2020/160498    8/2020

*Primary Examiner* — Mark W. Bockelman
(74) *Attorney, Agent, or Firm* — Crowell & Moring LLP

(57) ABSTRACT

A biocompatible soft pressure sensor comprises: a stretchable top electrode comprising a first elastomeric substrate and a first biocompatible conducting polymer coated on an inner surface of the first elastomeric substrate; a stretchable bottom electrode comprising a second elastomeric substrate including a textured inner surface comprising an array of peaked structures, and a second biocompatible conducting polymer coated on the textured inner surface, where a coated tip of each peaked structure is in contact with the first biocompatible conducting polymer; a top encapsulation layer on an outer surface of the first elastomeric substrate; and a bottom encapsulation layer on an outer surface of the second elastomeric substrate. A resistance measured by the biocompatible soft pressure sensor changes upon exposure to an external pressure.

20 Claims, 3 Drawing Sheets

(56) References Cited

U.S. PATENT DOCUMENTS

| | | | |
|---|---|---|---|
| 2015/0087953 A1* | 3/2015 | Chiou | A61B 3/16 600/398 |
| 2017/0181825 A1* | 6/2017 | Hunter | A61B 5/4312 |
| 2024/0255362 A1* | 8/2024 | Wang | G01L 5/0061 |

* cited by examiner

BIOCOMPATIBLE SOFT PRESSURE SENSOR AND METHOD OF MONITORING PRESSURE SUBCUTANEOUSLY

RELATED APPLICATION

The present patent document claims the benefit of priority under 35 U.S.C. 119(e) to U.S. Provisional Patent Application No. 63/339,623, which was filed on May 9, 2022, and is hereby incorporated by reference in its entirety.

TECHNICAL FIELD

This disclosure relates generally to pressure sensors and more particularly to a biocompatible soft pressure sensor for subcutaneous use.

BACKGROUND

Mastectomy, breast reconstruction, or other surgical or radiation interventions to the breast and/or surrounding tissues, or certain anatomic conditions or injuries, can result in diminished or lost sensation of the breast or other reductions in the various natural functions of the breast. To restore functionality in these situations, a bionic breast device is described in International Patent Application WO 2020160498, which published on Aug. 6, 2020 and is hereby incorporated by reference in its entirety. A desired component of the bionic breast device is a tissue-like pressure sensor having the capability to sense touches applied to the skin of the breast stably, over the long-term, and without causing an inflammatory or toxic tissue reaction. While a few existing pressure sensors meet some of the device specifications, including flexibility and stretchability, each lacks critical features that would be advantageous if not necessary for the bionic breast device.

In addition, the rising incidence of acquired cerebral injuries has heightened demand for in-home care and residential care facilities. It would be beneficial to provide these patients with greater independence and thereby reduce the need for residential care. Implantable sensors and motor neuroprosthetic devices that interface with the nervous system may be beneficial to restore independence in populations suffering from loss of sensation and/or motor function due to nerve injury. Existing sensors for this application have failed to achieve both biocompatibility and long-term robustness due to deterioration of their insulator coatings and aggravation of the foreign body response (FBR) by high-modulus materials. FBR may cause fibrotic encapsulation and destructive enzyme and ROS activity that can compromise device performance.

DRAWINGS

In order that the disclosure may be well understood, there will now be described various forms thereof, given by way of example, reference being made to the accompanying drawings, in which:

FIG. 1 provides an exploded-view schematic of an exemplary biocompatible soft pressure sensor.

The drawings described herein are for illustration purposes only and are not intended to limit the scope of the present disclosure in any way.

DETAILED DESCRIPTION

Described in this disclosure is a biocompatible soft pressure sensor for subcutaneous use as part of a bionic breast, an implantable neural prosthetic, or another subcutaneous device.

Figure 1:
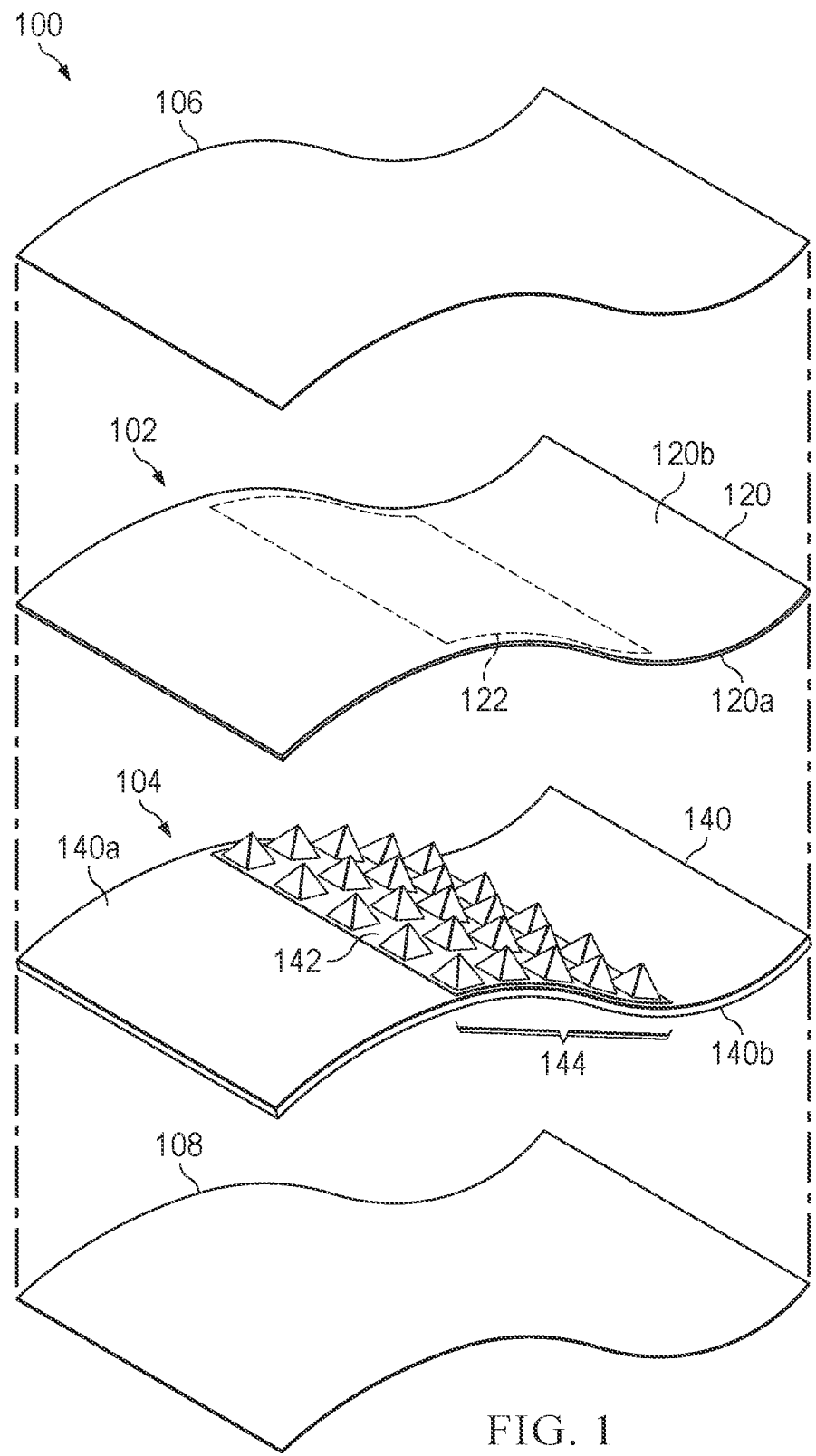
Figure 2:
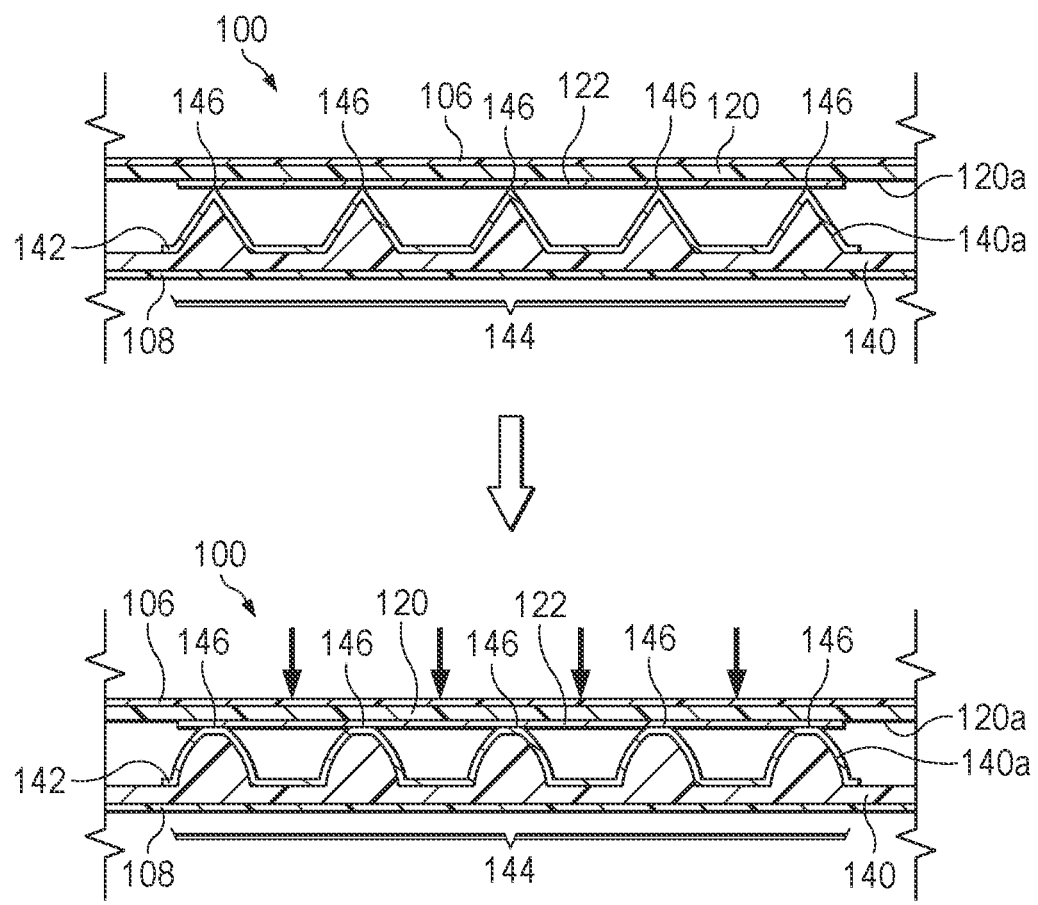
FIG. 2 shows a cross-sectional view of the biocompatible soft pressure sensor of FIG. 1 before (top) and after (bottom) exposure to an applied pressure to illustrate the working mechanism.

FIG. 1 provides an exploded view of the bicompatible soft pressure sensor 100, which is designed to have skin/tissue-like mechanical properties and be hermetically sealed for long-term implantation in the human body. The soft pressure sensor 100 includes stretchable top and bottom electrodes 102,104 and top and bottom encapsulation layers 106,108. The stretchable top electrode 102 includes a first elastomeric substrate 120 and a first biocompatible conducting polymer 122 coated on an inner surface 120a of the first elastomeric substrate 120. The stretchable bottom electrode 104 includes a second elastomeric substrate 140 having a textured inner surface 140a, and a second biocompatible conducting polymer 142 coated on the textured inner surface 140a. The textured inner surface 140a comprises an array of peaked structures 144, and a coated tip 146 of each peaked structure 144 is in contact with the first biocompatible conducting polymer 122, as illustrated in FIG. 2. The top encapsulation layer 106 is on an outer surface 120b of the first elastomeric substrate 120, and the bottom encapsulation layer 108 is on an outer surface 140b of the second elastomeric substrate 140, thereby providing a robust, biocompatible barrier between adjacent skin/tissue and sensor elements.

When an external pressure is applied to the pressure sensor 100, as illustrated in the cross-sectional schematics of FIG. 2, the contact area between the coated tips 146 and the first biocompatible conducting polymer 122 increases. Accordingly, the resistance measured by the biocompatible soft pressure sensor 100 changes upon exposure to the pressure. The change in resistance of the pressure sensor 100 may monotonically reflect the magnitude of the applied pressure. Since the sensor 100 is engineered for subcutaneous use, as discussed below, the external pressure may result from touching of skin and/or tissue that overlies the implanted sensor 100.

Each of the first and second elastomeric substrates 120, 140 comprise an elastomer, more particularly, a silicone elastomer or polyalkylsiloxane, such as poly(dimethyl siloxane) or PDMS. Elastomers tend to be flexible, stretchable, and soft. Such properties make it possible for the sensor 100 to conform to the adjacent skin/tissue and to flex and stretch while in use as part of an implantable system. Advantageously, the elastomer has a modulus (e.g., a Young's modulus) in a range from about 20 kPa to about 1 MPa. In some examples the modulus may be no greater than about 50 kPa, or no greater than about 35 kPa. In one example, the elastomer may comprise an Ecoflex™ silicone elastomer available from Smooth-On, Inc. (Macungie, PA). Typically, the first and second elastomeric substrates 120, 140 may have a thickness in a range from about 20 microns to about 500 microns.

The first and second biocompatible conducting polymers 122,142 that coat inner surfaces 120a,140a of the first and second elastomeric substrates 120,140 are also preferably soft and stretchable, with a low modulus comparable to that of the substrates 120,140. In addition, the biocompatible conducting polymers 122,142 may have good electrical conductivity and/or low toxicity. In contrast, metal coatings, which tend to be excellent conductors, may be unsuitable due to toxicity concerns and/or mechanical mismatch with surrounding tissue/skin. Advantageously, the first and second biocompatible conducting polymers 122,142 may exhibit a recoverable strain of at least about 15%, or at least about 25%, and in some examples the recoverable strain may be as high as about 50%. The low modulus and deformability of the first and second biocompatible conducting polymers 122,142 along with the elastomeric substrates 120,140 may enhance conformation to the surrounding tissue, thereby decreasing FBR and increasing sensitivity and robustness.

To prepare the first and second biocompatible conducting polymers 122,42, it may be beneficial to dope pristine polymers with additives, such as plasticizer(s) or dopant(s), that impart or improve the desired properties. The additives may be included in precast solutions of the polymers that can be applied to the inner surfaces 120a,140a of the first and second elastomeric substrates 120,140 by spin casting, spray casting, or another coating method to form coatings of the biocompatible conducting polymer 122,142. For example, a precast solution of poly(3,4-ethylenedioxythiophene) polystyrene sulfonate (PEDOT:PSS) may be doped with a sugar alcohol to enhance conductivity of the resulting film and enable stretchability up to 20% or 30%, on par with that of skin. Both the PEDOT:PSS and the sugar alcohol are non-toxic. One or both of the first and second biocompatible conducting polymers 122,142 may comprise the PEDOT:PSS and/or may be doped with the sugar alcohol. The concentration of the sugar alcohol in the biocompatible conducting polymer 122,142 may be in a range from about 1-5 wt. %. More specifically, the concentration may be at least 1 wt. %, or at least 3 wt. %, and/or up to 5 wt. %. The sugar alcohol may comprise erythritol, glycerol, mannitol, polyglycerol, sorbitol, and/or xylitol. Typically, each of the first and second biocompatible conducting polymers 122, 124, once coated on the inner surfaces 120a,140a of the first and second elastomeric substrates 120,140, have a thickness in a range from about 30 nm to about 5 µm. Generally speaking, the film surface, mechanical, and electrical properties of the biocompatible conducting polymers 122,124 can be tuned by changing the proportion (or concentration) of the dopant, the casting procedure, and/or the film thickness.

As indicated above, the second elastomeric substrate 140 has a textured inner surface 140a comprising an array of peaked structures 144, which are overlaid by the second biocompatible conducting polymer 142. The array of peaked structures 144 may be integrally formed with the second elastomeric substrate 140 (e.g., by molding). The peaked structures 144 may have a pyramidal, conical, or domed shape, or another three-dimensional shape having an apex that widens to a broader base. The apex may have a small radius of curvature (e.g., 0-30°) to ensure a small region of contact between the coated tips 146 of the peaked structures 144 and the biocompatible conducting polymer 122 when no pressure is applied (e.g., see top schematic of FIG. 2). The array may comprise a one- or two-dimensional array including from two to 200 of the peaked structures 144. The spacing between the peaked structures 144 may lie in a range from about 5 microns to about 20 microns. The sensitivity or dynamic range of the sensor 100 may be tuned by controlling the spacing between the peaked structures 144 and/or by varying the density of the peaked structures 144 in the array. Typically, each of the peaked structures has a height and/or width that lies in a range from about 20 microns to about 800 microns.

Advantageously, the top and bottom encapsulation layers 106,108 function to provide an impermeable or hermetic seal of the sensor 100 while exhibiting tissue-like mechanical properties, thereby enabling implantation within a human body long-term without degrading or causing an inflammatory or toxic tissue response (e.g., FBR). The encapsulation layers may limit solute exchange and mitigate biomolecule adsorption. Polymers such as parylene and polyurethane are deformable and biocompatible, but may suffer from gradual degradation by hydrolytic enzymes and free radicals, and may lack sufficient stretchability. The inventors have discovered that a fluorinated polymer, such as perfluoropolyether (PFPE), may be employed for the top and bottom encapsulation layers 106,108. The fluorination imparts hydrophobicity (or water repellency) to the encapsulation layers 106,108, and thus the fluorinated polymer may be referred to as a hydrophobic fluorinated polymer. Hydrophobicity may be defined by a liquid contact angle in excess of 90° when a liquid (e.g., water) is placed in contact with a surface (in this case, the surface of the encapsulation layers 106,108 comprising the fluorinated polymer). As would be recognized by one of ordinary skill in the art, higher contact angles indicate lower wettability, that is, a greater tendency of the liquid to bead up on the surface. As an alternative to the hydrophobic fluorinated polymer (e.g., PFPE), the top and bottom encapsulation layers 106,108 may comprise silicone. Both silicone and PFPE are biocompatible and impermeable (or negligibly permeable) to water and solutes. Typically, the top and bottom encapsulation layers 106,108 have a thickness in a range from 5 µm to 20 µm.

The biocompatible soft pressure sensor 100 illustrated in FIGS. 1 and 2 may be implanted in a human body and employed to monitor or measure pressure subcutaneously. The sensor 100 is engineered to be safe for long-term implantation and to exhibit the sensitivity of human skin over a range of behaviorally relevant conditions. In use, the biocompatible soft pressure sensor may exhibit a stretchability (or recoverable strain) of at least about 15% and/or up to about 50%. In other words, the sensor 100 may be stretched (e.g., lengthened) under an applied stress to at least 15% and up to 50% of its original length, and after release of the applied stress, the sensor 100 and may elastically return to its original length.

Figure 3:
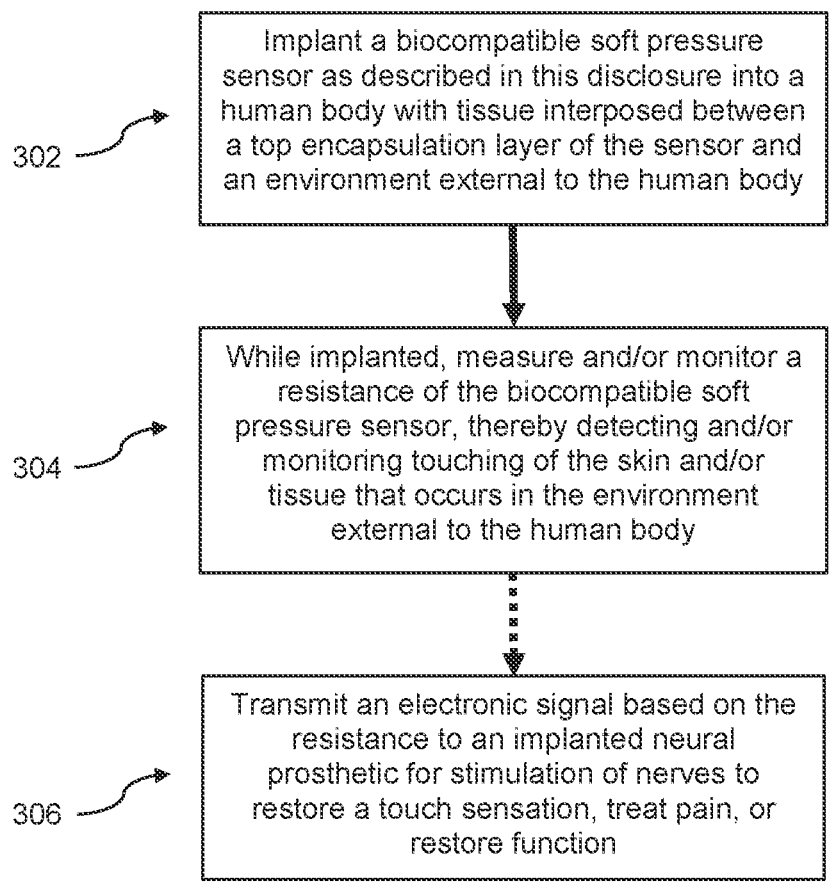
FIG. 3 is a flow chart showing steps of an exemplary method of monitoring pressure subcutaneously.

Referring to the flow chart of FIG. 3, the method may include implanting 302 the biocompatible soft pressure sensor 100 having any or all of the features described above or elsewhere in this disclosure into a human body. Implantation may take place using surgical methods known in the art.

During implantation, the biocompatible soft pressure sensor is positioned such that skin and/or tissue is interposed between the top encapsulation layer of the sensor and an environment external to the human body. The skin and/or tissue may include, for example, breast skin and/or breast tissue, genital skin, genital mucosa, and/or genital tissue, finger skin and/or finger tissue, toe skin and/or toe tissue, or face (e.g., lip) skin and/or face (e.g., lip) tissue. The biocompatible soft pressure sensor may be adjacent to, attached to, or embedded within a flexible wall of an implantable system, such as a breast or genital implant. Thus, in some examples, the flexible wall of the implantable system may also be interposed between the top encapsulation layer of the sensor and the external environment. The implantable system may be implanted into the human body with the biocompatible soft pressure sensor.

Once the sensor has been implanted, the resistance of the biocompatible soft pressure sensor may be measured or monitored 304. As discussed above in regard to FIG. 2, when an external pressure is applied to the implanted pressure sensor 100 (e.g., touching of the skin and/or tissue occurs), the contact area between the coated tips 146 and the first biocompatible conducting polymer 122 increases. Since the resistance measured by the biocompatible soft pressure sensor 100 changes upon exposure to the pressure, touching of the skin and/or tissue that occurs in the environment external to the human body may be detected and/or monitored for therapeutic or research purposes.

Use of the implanted biocompatible soft pressure sensor with an implanted neural prosthetic configured to interface with the nervous system may facilitate replacement or compensation of lost sensory and/or motor function. Accordingly, the method may further include transmitting 306 an electronic signal based on the resistance of the biocompatible soft pressure sensor to an implanted neural prosthetic for stimulation of nerves. The implantable neural prosthetic receives the output of the biocompatible soft pressure sensor and stimulates neuronal small structures in the nervous system with artificial electrical current impulses in order to restore the detected sensation and/or function. In one example, the nerve stimulation may restore a touch sensation to the skin and/or tissue. In another example, the nerve stimulation may treat pain resulting from tissue loss in a surgical procedure. Alternatively, the nerve stimulation may restore motor or other functionality lost due to nerve injury. For example, the nerve stimulation may restore one or more functions of the breast and/or nipple, such as nipple areolar function, including erection, or facilitation of lactation. A controller configured for transmission of the electronic signal may be electrically connected to the sensor and the neural prosthetic. Advantageously, the biocompatible soft pressure sensor exhibits a low detection limit, high sensitivity, long-term robustness and biocompatibility, low power consumption, and resistance output for simple integration with the implantable neural prosthetic.

The subject-matter of the disclosure may also relate, among others, to the following aspects:

A first aspect relates to a biocompatible soft pressure sensor comprising: a stretchable top electrode comprising a first elastomeric substrate and a first biocompatible conducting polymer coated on an inner surface of the first elastomeric substrate; a stretchable bottom electrode comprising a second elastomeric substrate including a textured inner surface comprising an array of peaked structures, and a second biocompatible conducting polymer coated on the textured inner surface, a coated tip of each peaked structure being in contact with the first biocompatible conducting polymer; a top encapsulation layer on an outer surface of the first elastomeric substrate; and a bottom encapsulation layer on an outer surface of the second elastomeric substrate, wherein a resistance measured by the biocompatible soft pressure sensor changes upon exposure to an external pressure.

A second aspect relates to the biocompatible soft pressure sensor of the first aspect, wherein the peaked structures have a pyramidal, conical, or domed shape.

A third aspect relates to the biocompatible soft pressure sensor of any preceding aspect, wherein each of the first and second elastomeric substrates comprises a silicone elastomer.

A fourth aspect relates to the biocompatible soft pressure sensor of any preceding aspect, wherein each of the first and second elastomeric substrates comprises an elastomer having a modulus in a range from about 20 kPa to about 1 MPa.

A fifth aspect relates to the biocompatible soft pressure sensor of the any preceding aspect, wherein each of the first and second biocompatible conducting polymers comprises a recoverable strain of at least about 15% and/or up to about 50%.

A sixth aspect relates to the biocompatible soft pressure sensor of any preceding aspect, wherein each of the first and second biocompatible conducting polymers comprises poly (3,4-ethylenedioxythiophene) polystyrene sulfonate (PEDOT:PSS) doped with a sugar alcohol.

A seventh aspect relates to the biocompatible soft pressure sensor of the sixth aspect, wherein a concentration of the sugar alcohol is in a range from about 1-5 wt. %.

An eighth aspect relates to the biocompatible soft pressure sensor of the sixth or seventh aspect, wherein the sugar alcohol is selected from the group consisting of erythritol, glycerol, mannitol, polyglycerol, sorbitol, and xylitol.

A ninth aspect relates to the biocompatible soft pressure sensor of any preceding aspect, wherein the top and bottom encapsulation layers comprise a hydrophobic fluorinated polymer.

A tenth aspect relates to the biocompatible soft pressure sensor of the preceding aspect, wherein the hydrophobic fluorinated polymer comprises perfluoropolyether (PFPE).

An eleventh aspect relates to the biocompatible soft pressure sensor of any preceding aspect, wherein the top and bottom encapsulation layers form an impermeable seal.

A twelfth aspect relates to the biocompatible soft pressure sensor of any preceding aspect, wherein the array comprises a one- or two-dimensional array including from two to 200 of the peaked structures.

A thirteenth aspect relates to the biocompatible soft pressure sensor of any preceding aspect, wherein a spacing between the peaked structures lies in a range from about 5 microns to about 20 microns.

A fourteenth aspect relates to the biocompatible soft pressure sensor of any preceding aspect, wherein a height and/or width of each of the peaked structures lies in a range from about 20 microns to about 800 microns.

A fifteenth aspect relates to the biocompatible soft pressure sensor of any preceding aspect, having a stretchability of at least about 15% and/or up to about 50%.

A sixteenth aspect relates to the biocompatible soft pressure sensor of any preceding claim being implantable in a human body.

A seventeenth aspect relates to a method of monitoring pressure subcutaneously, the method comprising: implanting the biocompatible soft pressure sensor of any preceding aspect into a human body with skin and/or tissue being interposed between the top encapsulation layer of the biocompatible soft pressure sensor and an environment external to the human body; and measuring a resistance of the biocompatible soft pressure sensor, thereby monitoring touching of the skin and/or tissue occurring in the environment external to the human body.

An eighteenth aspect relates to the method of the seventeenth aspect, wherein the skin and/or tissue comprises: breast skin and/or breast tissue; genital skin, genital mucosa, and/or genital tissue; finger skin and/or finger tissue; toe skin and/or toe tissue, face skin and/or face tissue; or lip skin and/or lip tissue.

A nineteenth aspect relates to the method of the seventeenth or eighteenth aspect, further comprising transmitting the resistance of the biocompatible soft pressure sensor to an implanted neural prosthetic for stimulation of nerves to restore a touch sensation to the skin and/or tissue.

A twentieth aspect relates to the method of any one of the seventeenth through the nineteenth aspects, further comprising transmitting the resistance of the biocompatible soft pressure sensor to an implanted neural prosthetic for stimulation of nerves to treat pain resulting from tissue loss in a surgical procedure.

A twenty-first aspect relates to the method of any one of the seventeenth through the twentieth aspects, wherein the biocompatible soft pressure sensor is adjacent to, attached to, or embedded within a flexible wall of an implantable system, and wherein the implantable system is implanted into the human body with the biocompatible soft pressure sensor.

A twenty-second aspect relates to the biocompatible soft pressure sensor of the twenty-first aspect, wherein the implantable system comprises a breast or genital implant.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A biocompatible soft pressure sensor comprising:
    a stretchable top electrode comprising a first elastomeric substrate and a first biocompatible conducting polymer coated on an inner surface of the first elastomeric substrate;
    a stretchable bottom electrode comprising a second elastomeric substrate including a textured inner surface comprising an array of peaked structures, and a second biocompatible conducting polymer coated on the textured inner surface, a coated tip of each peaked structure being in contact with the first biocompatible conducting polymer;
    a top encapsulation layer on an outer surface of the first elastomeric substrate; and
    a bottom encapsulation layer on an outer surface of the second elastomeric substrate,
    wherein a resistance measured by the biocompatible soft pressure sensor changes upon exposure to an external pressure.

2. The biocompatible soft pressure sensor of claim 1, wherein the peaked structures have a pyramidal, conical, or domed shape.

3. The biocompatible soft pressure sensor of claim 1, wherein each of the first and second elastomeric substrates comprises a silicone elastomer.

4. The biocompatible soft pressure sensor of claim 1, wherein each of the first and second elastomeric substrates comprises an elastomer having a modulus in a range from about 20 kPa to about 1 MPa.

5. The biocompatible soft pressure sensor of claim 1, wherein each of the first and second biocompatible conducting polymers comprises a recoverable strain of at least about 15% and/or up to about 50%.

6. The biocompatible soft pressure sensor of claim 1, wherein each of the first and second biocompatible conducting polymers comprises poly(3,4-ethylenedioxythiophene) polystyrene sulfonate (PEDOT:PSS) doped with a sugar alcohol.

7. The biocompatible soft pressure sensor of claim 6, wherein a concentration of the sugar alcohol is in a range from about 1-5 wt. %.

8. The biocompatible soft pressure sensor of claim 6, wherein the sugar alcohol is selected from the group consisting of erythritol, glycerol, mannitol, polyglycerol, sorbitol, and xylitol.

9. The biocompatible soft pressure sensor of claim 1, wherein the top and bottom encapsulation layers comprise a hydrophobic fluorinated polymer.

10. The biocompatible soft pressure sensor of claim 9, wherein the hydrophobic fluorinated polymer comprises perfluoropolyether (PFPE).

11. The biocompatible soft pressure sensor of claim 1, wherein the top and bottom encapsulation layers form an impermeable seal.

12. The biocompatible soft pressure sensor of claim 1, wherein the array comprises a one- or two-dimensional array including from two to 200 of the peaked structures.

13. The biocompatible soft pressure sensor of claim 1, wherein a spacing between the peaked structures lies in a range from about 5 microns to about 20 microns.

14. The biocompatible soft pressure sensor of claim 1, wherein a height and/or width of each of the peaked structures lies in a range from about 20 microns to about 800 microns.

15. A method of monitoring pressure subcutaneously, the method comprising:
    implanting the biocompatible soft pressure sensor of claim 1 into a human body with skin and/or tissue being interposed between the top encapsulation layer of the biocompatible soft pressure sensor and an environment external to the human body; and
    measuring a resistance of the biocompatible soft pressure sensor, thereby detecting touching of the skin and/or tissue occurring in the environment external to the human body.

16. The method of claim 15, wherein the skin and/or tissue comprises: breast skin and/or breast tissue; genital skin, genital mucosa, and/or genital tissue; finger skin and/or finger tissue; toe skin and/or toe tissue; face skin and/or face tissue; or lip skin and/or lip tissue.

17. The method of claim 15, further comprising transmitting an electronic signal based on the resistance of the biocompatible soft pressure sensor to an implanted neural prosthetic for stimulation of nerves.

18. The method of claim 17, wherein the stimulation of nerves leads to: restoration of a touch sensation to the skin and/or tissue; treatment of pain resulting from tissue loss in a surgical procedure; and/or restoration of motor or other functionality lost due to nerve injury.

19. The method of claim 15, wherein the biocompatible soft pressure sensor is adjacent to, attached to, or embedded within a flexible wall of an implantable system, and wherein the implantable system is implanted into the human body with the biocompatible soft pressure sensor.

20. The method of claim 19, wherein the implantable system comprises a breast or genital implant.

* * * * *